US010665016B2

(12) United States Patent
Wang et al.

(10) Patent No.: US 10,665,016 B2
(45) Date of Patent: May 26, 2020

(54) METHOD AND DEVICE FOR ADJUSTING THREE-DIMENSIONAL MODEL

(71) Applicant: Hangzhou Hikvision Digital Technology Co., Ltd., Hangzhou, Zhejiang (CN)

(72) Inventors: Quanzhan Wang, Zhejiang (CN); Jie Chen, Zhejiang (CN)

(73) Assignee: Hangzhou Hikvision Digital Technology Co., Ltd. (CN)

( * ) Notice: Subject to any disclaimer, the term of this patent is extended or adjusted under 35 U.S.C. 154(b) by 23 days.

(21) Appl. No.: 16/092,655

(22) PCT Filed: Dec. 22, 2016

(86) PCT No.: PCT/CN2016/111499
§ 371 (c)(1),
(2) Date: Oct. 10, 2018

(87) PCT Pub. No.: WO2017/177713
PCT Pub. Date: Oct. 19, 2017

(65) Prior Publication Data
US 2019/0139304 A1    May 9, 2019

(30) Foreign Application Priority Data

Apr. 12, 2016  (CN) .......................... 2016 1 0225309

(51) Int. Cl.
*G06T 19/00* (2011.01)
*G06T 19/20* (2011.01)
(Continued)

(52) U.S. Cl.
CPC .......... *G06T 19/00* (2013.01); *G06K 9/00771* (2013.01); *G06T 7/50* (2017.01);
(Continued)

(58) Field of Classification Search
None
See application file for complete search history.

(56) References Cited

U.S. PATENT DOCUMENTS 6,047,088 A *  4/2000  van Beek ................ G06T 9/001
                                                                  375/E7.083
6,415,171 B1   7/2002  Gueziec et al.
(Continued)

FOREIGN PATENT DOCUMENTS

CN         1567385 A      1/2005
CN       102147927 A      8/2011
(Continued)

OTHER PUBLICATIONS

International Search Report dated Mar. 24, 2017, issued in connection with International Application No. PCT/CN2016/111499, filed on Dec. 22, 2016, 2 pages.

*Primary Examiner* — Frank S Chen
(74) *Attorney, Agent, or Firm* — McDonnell Boehnen Hulbert & Berghoff LLP (57) ABSTRACT

A method and a device for adjusting a 3D model are disclosed. The method includes: fusing a 2D video and a 3D model of a target monitored area to generate a mesh model (S101); determining whether each set plane in the mesh model is even based on the location of a respective reference plane in the 3D model (S102); for each set plane that is uneven, referred to as a target set plane, selecting an uneven point in the target set plane as a mark point (S103), and generating a virtual plane based on the mark point and the reference plane corresponding to the target set plane (S104); and adding the virtual plane to the 3D model, and for the 2D video, saving the 3D model in which the virtual plane is added (S105). With the embodiments of the present application, operations for the uneven planes improve the effect of the fusion of a video and a 3D model. There is no need
(Continued)

to modify a 3D scene model, which reduces the labor cost and time cost of modifying the 3D scene model.

14 Claims, 2 Drawing Sheets

(51) Int. Cl.
*G06K 9/00* (2006.01)
*G06T 7/50* (2017.01)
*G06T 17/20* (2006.01)

(52) U.S. Cl.
CPC .............. *G06T 17/20* (2013.01); *G06T 19/20* (2013.01); *G06T 2207/10016* (2013.01); *G06T 2207/20221* (2013.01); *G06T 2207/30232* (2013.01); *G06T 2219/008* (2013.01); *G06T 2219/2021* (2013.01)

(56) References Cited

U.S. PATENT DOCUMENTS

| | | | |
|---|---|---|---|
| 6,570,608 B1 * | 5/2003 | Tserng | G06K 9/00335 348/143 |
| 2001/0035867 A1 * | 11/2001 | Murayama | A63F 13/10 345/585 |
| 2006/0106485 A1 * | 5/2006 | Landers | G05B 19/4097 700/182 |
| 2006/0233461 A1 | 10/2006 | Ma et al. | |
| 2012/0281873 A1 | 11/2012 | Brown et al. | |
| 2013/0215221 A1 * | 8/2013 | Wang | G06T 7/73 348/43 |

FOREIGN PATENT DOCUMENTS

| | | |
|---|---|---|
| CN | 103049896 A | 4/2013 |
| CN | 104537043 A | 4/2015 |
| CN | 104915986 A | 9/2015 |
| CN | 105096382 A | 11/2015 |
| CN | 105160710 A | 12/2015 |
| KR | 10-2011-0004267 A | 1/2011 |

* cited by examiner

METHOD AND DEVICE FOR ADJUSTING THREE-DIMENSIONAL MODEL

The present application is a US national phase under 35 U.S.C. § 371 of international application PCT/CN2016/111499, filed Dec. 22, 2016, which claims the priority to a Chinese Patent Application No. 20160225309.X, filed with the State Intellectual Property Office of the People's Republic of China on Apr. 12, 2016 and entitled "Method and device for adjusting three-dimensional model", which is incorporated herein by reference in its their entirety.

TECHNICAL FIELD

The present application relates to the technical field of video surveillance, and particularly to a method and device for adjusting a 3D model.

BACKGROUND

At present, 3D surveillance videos have been widely used in the field of video surveillance. A 3D surveillance video can display the events happened in a monitored area in a stereoscopic and panoramic manner, and realize the organic combination of the overall view and the detail control.

The method for generating a 3D surveillance video generally includes: establishing a 3D scene model of a monitored area; fusing videos of this monitored area from various fields of view within the same period to the 3D scene model so as to generate a 3D panoramic surveillance video for this monitored area.

In practical applications, it is often the case that a plane in the 3D surveillance video generated from the fusion of a video and a 3D model is uneven, which results in poor fusion result. For example, when establishing a 3D model, a certain ground is a lawn. However, this ground has become a flat floor when taking a video. In this case, the resulting ground will be very uneven from the fusion of this 3D model and this video, resulting in a very poor visual impression.

For such a case, the typical solution is to modify the 3D model so that the ground generated after the fusion is a flat ground. However, this requires a frequent modification to the 3D model very often when fusing the 3D model with different videos, while the process of modifying a 3D scene model is very complex, resulting in both high labor cost and high time cost.

SUMMARY

The objective of embodiments of the present application is to provide a method and device for adjusting a 3D model, which improve the fusion effects of a video and a 3D model without modifying the 3D model.

To achieve the above objectives, an embodiment of the present application discloses a method for adjusting a 3D model, which is applicable to a computer and includes:

fusing a 2D video and a 3D model of a target monitored area to generate a mesh model;

determining whether each set plane in the mesh model is even based on a stored location of a respective reference plane in the 3D model;

when there is an uneven set plane, referred to as a target set plane, in the mesh model, for each target set plane, selecting an uneven point in the target set plane as a mark point, and generating a virtual plane based on the mark point and a reference plane corresponding to the target set plane; and adding the virtual plane to the 3D model, and for the 2D video, saving the 3D model in which the virtual plane is added.

Optionally, fusing a 2D video and a 3D model of a target monitored area to generate a mesh model may include:

obtaining a 2D image of the 3D model of the target monitored area and a correspondence between the 2D image and depth information;

replacing the 2D image with a video image in the 2D video of the target monitored area; and adding the depth information to the replaced 2D image based on the correspondence between the 2D image and the depth information to generate the mesh model.

Optionally, determining whether each set plane in the mesh model is even based on the stored location of a respective reference plane in the 3D model may include:

determining a reference plane corresponding to each of set planes based on a stored correspondence between the set planes and reference planes;

for each set plane, determining whether a distance from each point in the set plane to the reference plane corresponding to the set plane is greater than a first threshold, if so, determining this point as an uneven point; and determining whether the number of uneven points on the set plane is greater than a second threshold, if so, determining that the set plane is uneven.

Optionally, selecting an uneven point in the target set plane as a mark point may include:

selecting a point in the target set plane, which is furthest away from the reference plane corresponding to the target set plane, as a mark point;

or, determining a distance from each of uneven points in the target set plane to the reference plane corresponding to the target set plane, calculating the difference between the distance and the first threshold; obtaining the number of the uneven points in each of preset difference intervals, and identifying a difference interval with the largest number of uneven points as a mark difference interval, and determining a point in the mark difference interval as a mark point.

Optionally, generating a virtual plane based on the mark point and the reference plane corresponding to the target set plane may include:

when the number of the mark points is one, generating a virtual plane which passes through the mark point and is parallel to the reference plane corresponding to the target set plane; and when the number of the mark points is more than one, selecting one of the mark points and generating a virtual plane that passes through the selected mark point and is parallel to the reference plane corresponding to the target set plane.

Optionally, the set plane includes ground and/or wall surfaces.

To achieve the above objectives, an embodiment of the present application discloses a device for adjusting a 3D model applicable to a computer. The device includes:

a fusion module, configured for fusing a 2D video and a 3D model of a target monitored area to generate a mesh model;

a judgment module, configured for determining whether each set plane in the mesh model is even based on a stored location of a respective reference plane in the 3D model, and if not, triggering a selection module;

the selection module, configured for selecting, for each set plane that is uneven, referred to as a target set plane, an uneven point in the target set plane as a mark point;

a generation module, configured for generating a virtual plane based on the mark point and a reference plane corresponding to the target set plane; and an addition and saving module, configured for adding the virtual plane to the 3D model, and for the 2D video, saving the 3D model in which the virtual plane is added.

Optionally, the fusion module may include:

an obtaining submodule, configured for obtaining a 2D image of the 3D model of the target monitored area and a correspondence between the 2D image and depth information;

a replacement submodule, configured for replacing the 2D image with a video image in the 2D video of the target monitored area; and a generation submodule, configured for adding the depth information to the replaced 2D image based on the correspondence between the 2D image and the depth information to generate the mesh model.

Optionally, the judgment module may include:

a determination submodule, configured for determining a reference plane corresponding to each of set planes based on a stored correspondence between the set planes and reference planes;

a first judgment submodule, configured for determining whether a distance from each point in the set plane to the reference plane corresponding to the set plane is greater than a first threshold, and if so, determining this point as an uneven point; and a second judgment submodule, configured for determining whether the number of uneven points on the set plane is greater than a second threshold, and if so, determining that the set plane is uneven.

Optionally, the selection module may include:

a first selection submodule, configured for, for each target set plane, selecting a point in the target set plane, which is furthest away from the reference plane corresponding to the target set plane, as a mark point;

or, a second selection submodule, configured for, for each target set plane, determining a distance from each of uneven points in the target set plane to the reference plane corresponding to the target set plane, calculating the difference between the distance and the first threshold; obtaining the number of the uneven points in each of preset difference intervals, and identifying a difference interval with the largest number of uneven points as a mark difference interval, and determining a point in the mark difference interval as a mark point.

Optionally, the generation module may include:

a first generation submodule, configured for generating a virtual plane which passes through the mark point and is parallel to the reference plane corresponding to the target set plane, when the number of the mark points is one; and a second generation submodule, configured for selecting one of the mark points and generating a virtual plane that passes through the selected mark point and is parallel to the reference plane corresponding to the target set plane, when the number of the mark points is more than one.

Optionally, the set plane includes ground and/or wall surfaces.

To achieve the above objectives, an embodiment of the present application discloses an electronic apparatus, which includes a housing, a processor, a memory, a circuit board and a power supply circuit. The circuit board is arranged inside a space enclosed by the housing. The processor and the memory are arranged on the circuit board. The power supply circuit is used to supply power for various circuits or elements of the electronic apparatus. The memory is used to store executable program codes, and the processor executes the executable program codes stored in the memory by reading the executable program codes so as to carry out the above method for adjusting a 3D model.

To achieve the above objectives, an embodiment of the present application discloses an executable program code executed to carry out the method for adjusting a 3D model.

To achieve the above objectives, an embodiment of the present application discloses a storage medium for storing executable program codes that are executed to perform the method for adjusting a 3D model.

The above technical solutions include: fusing a 2D video and a 3D model of a target monitored area to generate a mesh model; determining whether each set plane in the mesh model is even based on a stored location of a respective reference plane in the 3D model; when there is an uneven set plane that is referred to as a target set plane in the mesh model, for each target set plane, selecting an uneven point in the target set plane as a mark point and generating a virtual plane based on the mark point and the reference plane corresponding to the target set plane; adding the virtual plane to the 3D model, and for the 2D video, saving the 3D model in which the virtual plane is added. With the embodiments of the present application, a virtual plane is generated for an uneven plane generated by fusing a video and a 3D model, and the generated virtual plane is combined with the 3D model, which are saved as an adjusted 3D model. The operations for the uneven plane improve the effect of the fusion of a video and a 3D model. There is no need to modify a 3D scene model, which reduces the labor cost and time cost of modifying the 3D scene model.

Of course, a product or method implementing the present application is not necessarily have all the advantages mentioned above.

BRIEF DESCRIPTION OF DRAWINGS

In order to more clearly describe the embodiments of the present application and the technical solutions in the prior art, drawings required for embodiments of the present application and the prior art will be described briefly below. It is obvious that the drawings below are for only some embodiments of the present application, and those skilled in the art can obtain other drawings based on these drawings without any creative efforts.

DETAILED DESCRIPTION

The technical solutions in the embodiments of the present application will be described clearly and completely below with reference to the accompanying drawings. Obviously, the described embodiments are only some of the embodiments of the present application, rather than all of the embodiments. All other embodiments obtained based on the embodiments herein by those skilled in the art without any creative effort fall within the protection scope defined by the present application.

In order to solve the existing technical problems, embodiments of the present application provide a method and a device for adjusting a 3D model, which are applicable to various electronic apparatuses, such as computers, tablet computers, but is not limited thereto. Now, the method for adjusting a 3D model provided by an embodiment of the present application will be described in detail.

Figure 1:
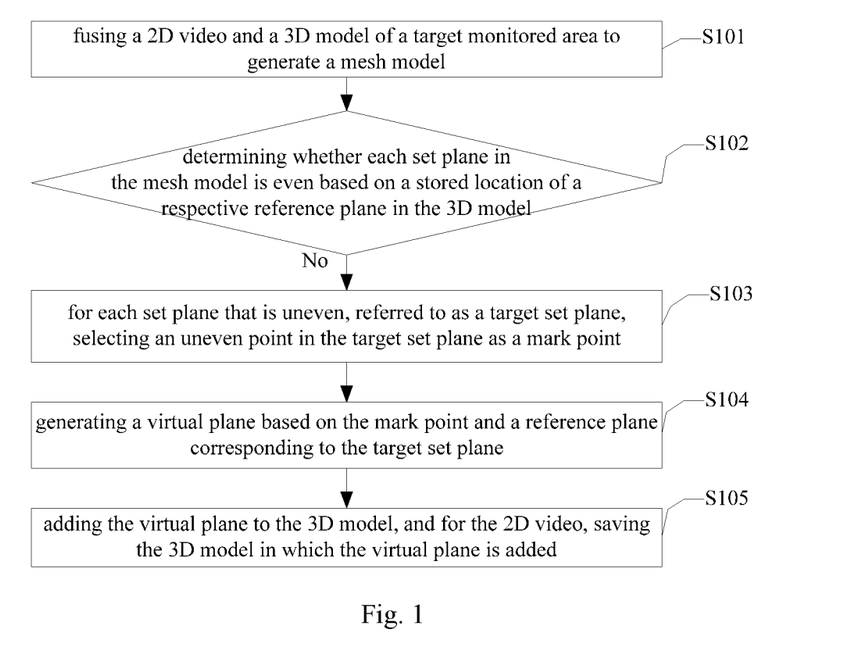
FIG. 1 is a schematic flowchart of a method for adjusting a 3D model provided by an embodiment of the present application.

FIG. 1 is a schematic flowchart of a method for adjusting a 3D model provided by an embodiment of the present application. The method includes:

S101: fusing a 2D video and a 3D model of a target monitored area to generate a mesh model.

Specifically, this step can include:

obtaining a 2D image of the 3D model of the target monitored area and a correspondence between the 2D image and depth information;

replacing the 2D image with a video image in the 2D video of the target monitored area;

adding the depth information to the replaced 2D image based on the correspondence between the 2D image and the depth information to generate the mesh model.

In an embodiment illustrated in the present application, it is assumed that coordinates of a point in the 3D model P of the target monitored area are represented as (x, y, z), coordinates of a point in an obtained 2D image P1 of the 3D model P are represented as (x, y), the correspondence between the 2D image P1 and depth information P2 of the 3D model P is obtained, and the depth information P2 of the point is represented as (z).

Coordinates of a point in each video image of a 2D video Q of the target monitored area are represented as (x, y). The points in the 2D image P1 are replaced with respective points in the 2D video Q, and the depth information P2 is added to the replaced 2D image P1, i.e., respective video image in the 2D video Q, based on the correspondence between the 2D image P1 and depth information P2, to generate a mesh model in which coordinates of a point is represented as (x, y, z).

S102: determining whether each set plane in the mesh model is even based on a stored location of a respective reference plane in the 3D model. If the set plane in the mesh model is even, proceeding to step S103, otherwise, performing no adjustment on the 3D model.

Specifically, this step can include:

determining a reference plane corresponding to each of set planes based on a stored correspondence between the set planes and reference planes;

for each set plane, determining whether a distance from each point in the set plane to the reference plane corresponding to the set plane is greater than a first threshold, if so, determining this point as an uneven point; and determining whether the number of uneven points on the set plane is greater than a second threshold, if so, determining that the set plane is uneven.

The set plane can include the ground and/or wall surfaces.

In an optional example, during the establishment of a 3D model, planes in the 3D model are generally generated based on reference planes. For example, the ground in the 3D model is generated based on a horizontal reference plane, and the wall in the 3D model is generated based on a vertical reference plane.

For a 3D model, locations of all reference planes are stored. The locations of reference planes can be stored in the form of coordinates. For example, the z-axis coordinate of the reference plane of a ground A in the 3D model is 10, and the x-axis coordinate of the reference plane of a wall surface B in the 3D model is 50.

The mesh model stores correspondences between all the reference planes and set planes in the mesh model. A reference plane is determined for each of the set planes based on the correspondences. For example, a ground A in the 3D model is mapped into a ground A1 in the mesh model, and the reference plane corresponding to the ground A1 is the reference plane whose z-axis coordinate is 10. A wall surface B in the 3D model is mapped into a wall surface B1 in the mesh model, and the reference plane corresponding to the wall surface B1 is the reference plane whose x-axis coordinate is 50.

For the ground A1, it is determined whether the distance from a point on the ground A1 to the reference plane is greater than the first threshold. Assuming the first threshold is 1, the points having a distance to the reference plane larger than 1 is determined as uneven points.

Assuming the second threshold is 5, it is determined whether the number of uneven points on the ground A1 is larger than 5. If so, it is determined that the ground A1 is uneven.

For the wall surface B1, it is determined whether the distance from a point on the wall surface B1 to the reference plane whose x-axis coordinate is 50 is greater than 1. The points having a distance to the reference plane larger than 1 is determined as uneven points.

It is determined whether the number of uneven points on the wall surface B1 is larger than 5. If so, it is determined that the wall surface B1 is uneven.

S103: for each set plane that is uneven, referred to as a target set plane, selecting an uneven point in the target set plane as a mark point.

Specifically, the selection of an uneven point in the target set plane as a mark point can be performed in two ways.

The first way is to select a point in the target set plane, which is furthest away from the reference plane corresponding to the target set plane, as a mark point.

The second way is to determine the distance from each of the uneven points in the target set plane to the reference plane corresponding to the target set plane, and calculate the difference between the distance and the first threshold; obtain the number of the uneven points in each of preset difference intervals, and identify a difference interval with the largest number of uneven points as a mark difference interval, and determine a point in the mark difference interval as a mark point.

Assuming that the number of uneven points on the ground A1 is more than 5, and the number of uneven points on the wall B1 is less than 5, then it is determined that the ground A1 is uneven and the ground A1 is the target set plane.

For example, the number of uneven points on the ground A1 is 6, the distances from these six uneven points to the reference plane corresponding to the ground A1 are 4, 4, 3, 7, 3 and 4.

In the first way, the uneven point the distance from which to the reference plane corresponding to the ground A1 is 7 is selected as the mark point.

Alternatively, in the second way, the differences between the six distances (4, 4, 3, 7, 3, 4) and the first threshold 1 are calculated, which are 3, 3, 2, 6, 2, and 3 respectively. For example, the preset difference intervals are 0-1, 2-3, 4-5, 6-7, and 8-9. The number of uneven points in each difference interval is obtained through statistics, as shown in Table 1.

TABLE 1

| | difference intervals | | | | |
|---|---|---|---|---|---|
| | 0-1 | 2-3 | 4-5 | 6-7 | 8-9 |
| the number of uneven points | 0 | 5 | 0 | 1 | 0 |

The difference interval of 2-3 is identified as the mark difference interval in which the number of uneven points is the largest, and the five points within the difference interval of 2-3 (i.e., the points whose distances from the reference plane of the ground A1 are 2 or 3) are determined as mark points.

S104: generating a virtual plane based on the mark point and a reference plane corresponding to the target set plane.

Specifically, this step can include:

when the number of the mark points is one, generating a virtual plane which passes through the mark point and is parallel to the reference plane corresponding to the target set plane;

when the number of the mark points is more than one, selecting one of the mark points and generating a virtual plane that passes through the selected mark point and is parallel to the reference plane corresponding to the target set plane.

In an embodiment of the present application, the virtual plane is a plane parallel to the reference plane corresponding to the target set plane. Thus, once a point for the virtual plane is determined, the location of the virtual plane can be determined.

When there is only one mark point, the location of the virtual plane can be determined through this mark point. When there are more than one mark points, any of these mark points may be selected to determine the location of the virtual plane. For example, one mark point is arbitrarily selected from the above five mark points, and a virtual plane is generated which passes through the selected mark point and is parallel to the reference plane corresponding to the target set plane.

S105: adding the virtual plane to the 3D model, and for the 2D video, saving the 3D model in which the virtual plane is added.

The generated virtual plane is for the 2D video Q, and is not necessarily applicable to other 2D videos of the target monitored area. For example, the reason why the ground A1 in the mesh model generated by the fusion of the 3D model P and the 2D video Q is uneven may be that the ground A in the 3D model P is a lawn surface, which becomes an even floor when the 2D video Q is taken. Since points on the lawn surface are not at the same level, this plane is not flat or uneven. When a 2D video S is taken for the target monitored area, the ground A is laid with a lawn again. Thus, the generated virtual plane is not applicable to the 2D video S.

Thus, adding the generated virtual plane to the 3D model P is only to store, for the 2D video Q, the location of this virtual plane in the 3D model P, rather than to modify the 3D model. In addition, different virtual planes are saved for different 2D videos of the target monitored area. The virtual plane for a 2D video is displayed only when displaying a panoramic video generated by fusing this 2D video and a 3D model of the target monitored area. The effect of the fusion of the video and the 3D model is thus improved.

Optionally, the generated virtual plane can be translucent, resulting in better vision effect for the generated panoramic video.

The embodiment of the present application as shown in FIG. 1 includes: fusing a 2D video and a 3D model of a target monitored area to generate a mesh model; determining whether each set plane in the mesh model is even based on a stored location of a respective reference plane in the 3D model; when there is an uneven set plane that is referred to as a target set plane in the mesh model, for each target set plane, selecting an uneven point in the target set plane as a mark point, and generating a virtual plane based on the mark point and the reference plane corresponding to the target set plane; adding the virtual plane to the 3D model, and for the 2D video, saving the 3D model in which the virtual plane is added. With the embodiments of the present application, a virtual plane is generated for an uneven plane generated by fusing a video and a 3D model, and the generated virtual plane is combined with the 3D model, which are saved as an adjusted 3D model. The operations for the uneven plane improve the effect of the fusion of the video and the 3D model. There is no need to modify a 3D scene model, which reduces the labor cost and time cost for modifying the 3D scene model.

Corresponding to the embodiments of the method described above, embodiments of the present application further provide a device for adjusting a 3D model.

Figure 2:
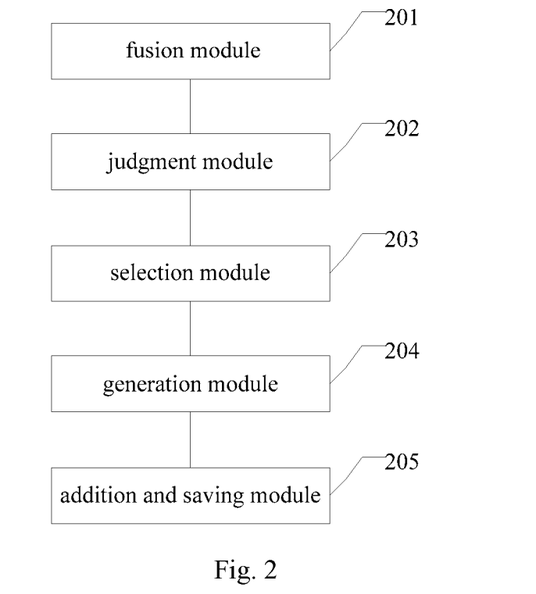
FIG. 2 is a schematic diagram of the structure of a device for adjusting a 3D model provided by an embodiment of the present application.

FIG. 2 is a schematic diagram of the structure of a device for adjusting a 3D model provided by an embodiment of the present application. The device includes:

a fusion module 201, configured for fusing a 2D video and a 3D model of a target monitored area to generate a mesh model.

In an embodiment of the present application, the fusion module 201 can include an obtaining submodule, a replacement submodule and a generation submodule (not shown in the figure).

The obtaining submodule is configured for obtaining a 2D image of the 3D model of the target monitored area and a correspondence between the 2D image and depth information.

The replacement submodule is configured for replacing the 2D image with a video image in the 2D video of the target monitored area.

The generation submodule is configured for adding the depth information to the replaced 2D image based on the correspondence between the 2D image and the depth information to generate the mesh model.

A judgment module 202 is configured for determining whether each set plane in the mesh model is even based on a stored location of a respective reference plane in the 3D model, and if not, triggering a selection module 203.

In an embodiment of the present application, the judgment module 202 can include a determination submodule, a first judgment submodule and a second judgment submodule (not shown in the figure).

The determination submodule is configured for determining a reference plane corresponding to each of set planes based on a stored correspondence between the set planes and reference planes.

The first judgment submodule is configured for determining whether a distance from each point in the set plane to the reference plane corresponding to the set plane is greater than a first threshold, and if so, determining this point as an uneven point.

The second judgment submodule is configured for determining whether the number of uneven points on the set plane is greater than a second threshold, and if so, determining that the set plane is uneven.

The selection module 203 is configured for selecting, for each set plane that is uneven, referred to as a target set plane, an uneven point in the target set plane as a mark point;

In an embodiment of the present application, the selection module 203 can include:

a first selection submodule configured for, for each target set plane, selecting a point in the target set plane, which is furthest away from the reference plane corresponding to the target set plane, as a mark point;

or, a second selection submodule configured for, for each target set plane, determining a distance from each of uneven points in the target set plane to the reference plane corresponding to the target set plane, calculating the difference between the distance and the first threshold; obtaining the number of the uneven points in each of preset difference intervals, and identifying a difference interval with the largest number of uneven points as a mark difference interval, and determining a point in the mark difference interval as a mark point.

A generation module 204 is configured for generating a virtual plane based on the mark point and a reference plane corresponding to the target set plane.

In an embodiment of the present application, the generation module 204 can include a first generation submodule and a second generation submodule (not shown in the figure).

The first generation submodule is configured for generating a virtual plane that passes through the mark point and is parallel to the reference plane corresponding to the target set plane, when the number of the mark points is one.

The second generation submodule is configured for selecting one of the mark points and generating a virtual plane that passes through the selected mark point and is parallel to the reference plane corresponding to the target set plane, when the number of the mark points is more than one.

An addition and saving module 205 is configured for adding the virtual plane to the 3D model, and for the 2D video, saving the 3D model in which the virtual plane is added.

In an embodiment as shown in the present application, a set plane includes ground and/or wall surfaces.

With the embodiment of the present application shown in FIG. 2, the following operations can be performed: fusing a 2D video and a 3D model of a target monitored area to generate a mesh model; determining whether each set plane in the mesh model is even based on the stored location of a respective reference plane in the 3D model; when there is an uneven set plane that is referred to as a target set plane in the mesh model, for each target set plane, selecting an uneven point in the target set plane as a mark point and generating a virtual plane based on the mark point and the reference plane corresponding to the target set plane; adding the virtual plane to the 3D model, and saving, for the 2D video, a 3D model in which the virtual plane is added. With the embodiment of the present application, a virtual plane is generated for an uneven plane generated by fusing a video and a 3D model, and the generated virtual plane is combined with the 3D model, which are saved as an adjusted 3D model. The operations for the uneven planes improve the effect of the fusion of a video and a 3D model. There is no need to modify a 3D scene model, which reduces the labor cost and time cost of modifying the 3D scene model.

Figure 3:
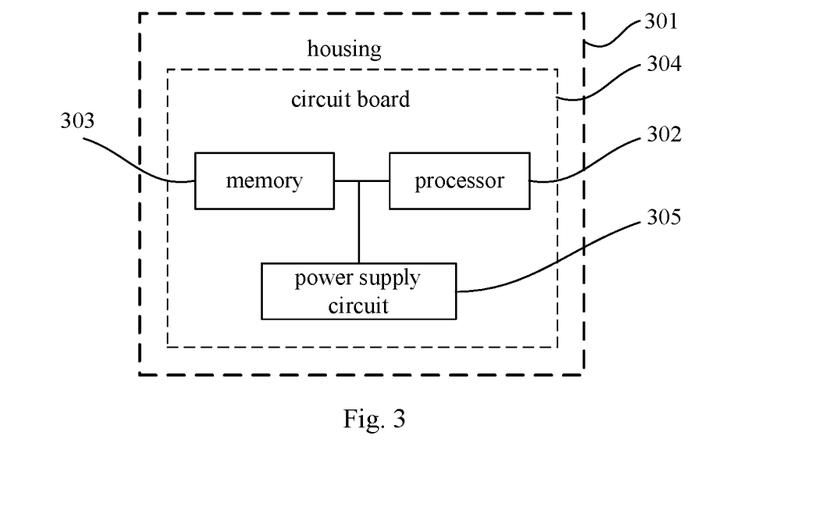
FIG. 3 is a schematic diagram of the structure of an electronic apparatus provided by embodiments of the present application.

An embodiment of the present application provides an electronic apparatus, as shown in FIG. 3. The electronic apparatus includes a housing 301, a processor 302, a memory 303, a circuit board 304 and a power supply circuit 305. The circuit board 304 is arranged inside a space enclosed by the housing 301. The processor 302 and the memory 303 are arranged on the circuit board 304. The power supply circuit 305 is used to supply power for various circuits or elements of the electronic apparatus. The memory 303 is used to store executable program codes, and the processor 302 executes the executable program codes stored in the memory 303 by reading the executable program codes so as to carry out a method for adjusting a 3D model. The method includes:

fusing a 2D video and a 3D model of a target monitored area to generate a mesh model;

determining whether each set plane in the mesh model is even based on a stored location of a respective reference plane in the 3D model;

when there is an uneven set plane, referred to as a target set plane, in the mesh model, for each target set plane, selecting an uneven point in the target set plane as a mark point, and generating a virtual plane based on the mark point and a reference plane corresponding to the target set plane; and adding the virtual plane to the 3D model, and for the 2D video, saving the 3D model in which the virtual plane is added.

With the embodiment shown in FIG. 3 of the present application, a virtual plane is generated for an uneven plane generated by fusing a video and a 3D model, and the generated virtual plane is combined with the 3D model, which are saved as an adjusted 3D model. The operations for the uneven plane improve the effect of the fusion of a video and a 3D model. There is no need to modify a 3D scene model, which reduces the labor cost and time cost of modifying the 3D scene model.

An embodiment of the present application provides an executable program code, which is executed to perform a method for adjusting a 3D model. The method includes:

fusing a 2D video and a 3D model of a target monitored area to generate a mesh model;

determining whether each set plane in the mesh model is even based on a stored location of a respective reference plane in the 3D model;

when there is an uneven set plane, referred to as a target set plane, in the mesh model, for each target set plane, selecting an uneven point in the target set plane as a mark point, and generating a virtual plane based on the mark point and a reference plane corresponding to the target set plane; and adding the virtual plane to the 3D model, and for the 2D video, saving the 3D model in which the virtual plane is added.

With the embodiment of the present application, a virtual plane is generated for an uneven plane generated by fusing a video and a 3D model, and the generated virtual plane is combined with the 3D model, which are saved as an adjusted 3D model. The operations for the uneven plane improve the effect of the fusion of a video and a 3D model. There is no need to modify a 3D scene model, which reduces the labor cost and time cost of modifying the 3D scene model.

Based on the same invention concept, an embodiment of the present application provide a storage medium for storing executable program codes that are executed to perform a method for adjusting a 3D model. The method includes:

fusing a 2D video and a 3D model of a target monitored area to generate a mesh model;

determining whether each set plane in the mesh model is even based on a location of a respective reference plane in the 3D model;

when there is an uneven set plane, referred to as a target set plane, in the mesh model, for each target set plane, selecting an uneven point in the target set plane as a mark point, and generating a virtual plane based on the mark point and a reference plane corresponding to the target set plane; and adding the virtual plane to the 3D model, and for the 2D video, saving the 3D model in which the virtual plane is added.

With the embodiments shown in the present application, a virtual plane is generated for an uneven plane generated by fusing a video and a 3D model, and the generated virtual plane are saved together with the 3D model as an adjusted 3D model. The operations for the uneven plane improve the effect of the fusion of a video and a 3D model. There is no need to modify a 3D scene model, which reduces the labor cost and time cost of modifying the 3D scene model.

It should be noted that the relationship terms herein such as "first", "second" and the like are only used to distinguish one entity or operation from another entity or operation, but do not necessarily require or imply that there is an actual relationship or order among these entities or operations. Moreover, the terms "include", "comprise" or any variants thereof are intended to cover a non-exclusive inclusion, such that processes, methods, articles or devices including a series of elements include not only those elements listed, but also other elements not specifically listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

All the embodiments herein are described in a correlated manner, and identical or similar parts in an embodiment can be referred to another. The description for each embodiment focuses on the differences with other embodiments. In particular, for the device embodiment, since it is basically similar to the method embodiment, the description is relatively simple, and the relevant parts can be referred to the description of the method embodiment.

It can be understood by a person skilled in the art that all or some steps in the implementations of the above method can be carried out by related hardware being instructed by programs, which can be stored in a computer readable storage medium, such as a ROM/RAM, disk and optical disk.

The embodiments described above are just preferred embodiments of the present application, and not indented to limit the protection scope of the present application. Any modifications, alternatives, improvements or the like within the spirit and principle of the present application shall be included in the protection scope of the present application.

What is claimed is:

1. A method for adjusting a 3D model applicable to a computer, comprising:
    fusing a 2D video and a 3D model of a target monitored area to generate a mesh model;
    determining whether each set plane in the mesh model is even based on a stored location of a respective reference plane in the 3D model;
    when there is an uneven set plane, referred to as a target set plane, in the mesh model, for each target set plane, selecting an uneven point in the target set plane as a mark point, and generating a virtual plane based on the mark point and a reference plane corresponding to the target set plane; and
    adding the virtual plane to the 3D model, and for the 2D video, saving the 3D model in which the virtual plane is added.

2. The method of claim 1, wherein fusing a 2D video and a 3D model of a target monitored area to generate a mesh model comprises:
    obtaining a 2D image of the 3D model of the target monitored area and a correspondence between the 2D image and depth information;
    replacing the 2D image with a video image in the 2D video of the target monitored area; and
    adding the depth information to the replaced 2D image based on the correspondence between the 2D image and the depth information to generate the mesh model.

3. The method of claim 1, wherein determining whether each set plane in the mesh model is even based on a stored location of a respective reference plane in the 3D model, comprises:
    determining a reference plane corresponding to each of set planes based on a stored correspondence between the set planes and reference planes;
    for each set plane,
        determining whether a distance from each point in the set plane to the reference plane corresponding to the set plane is greater than a first threshold, and if so, determining this point as an uneven point; and
        determining whether the number of uneven points on the set plane is greater than a second threshold, and if so, determining that the set plane is uneven.

4. The method of claim 3, wherein selecting an uneven point in the target set plane as a mark point comprises:
    selecting a point in the target set plane, which is furthest away from the reference plane corresponding to the target set plane, as a mark point;
    or,
    determining a distance from each of uneven points in the target set plane to the reference plane corresponding to the target set plane, calculating the difference between the distance and the first threshold; obtaining the number of the uneven points in each of preset difference intervals, and identifying a difference interval with the largest number of uneven points as a mark difference interval, and determining a point in the mark difference interval as a mark point.

5. The method of claim 4, wherein generating a virtual plane based on the mark point and a reference plane corresponding to the target set plane, comprises:
    when the number of the mark points is one, generating a virtual plane that passes through the mark point and is parallel to the reference plane corresponding to the target set plane; and
    when the number of the mark points is more than one, selecting one of the mark points and generating a virtual plane that passes through the selected mark point and is parallel to the reference plane corresponding to the target set plane.

6. The method of claim 1, wherein the set plane comprises ground and/or wall surfaces.

7. A storage medium storing executable program codes which are executed to carry out the method for adjusting a 3D model of claim 1.

8. A device for adjusting a 3D model applicable to a computer, comprising:
    a fusion module configured for fusing a 2D video and a 3D model of a target monitored area to generate a mesh model;

a judgment module configured for determining whether each set plane in the mesh model is even based on a stored location of a respective reference plane in the 3D model, and if not, triggering a selection module;

the selection module configured for selecting, for each set plane that is uneven, referred to as a target set plane, an uneven point in the target set plane as a mark point;

a generation module configured for generating a virtual plane based on the mark point and a reference plane corresponding to the target set plane; and an addition and saving module configured for adding the virtual plane to the 3D model, and for the 2D video, saving the 3D model in which the virtual plane is added.

9. The device of claim 8, wherein the fusion module comprises:

an obtaining submodule configured for obtaining a 2D image of the 3D model of the target monitored area and a correspondence between the 2D image and depth information;

a replacement submodule configured for replacing the 2D image with a video image in the 2D video of the target monitored area; and a generation submodule configured for adding the depth information to the replaced 2D image based on the correspondence between the 2D image and the depth information to generate the mesh model.

10. The device of claim 8, wherein the judgment module comprises:

a determination submodule configured for determining a reference plane corresponding to each of set planes based on a stored correspondence between the set planes and reference planes;

a first judgment submodule configured for determining whether a distance from each point in the set plane to the reference plane corresponding to the set plane is greater than a first threshold, and if so, determining this point as an uneven point; and a second judgment submodule configured for determining whether the number of uneven points on the set plane is greater than a second threshold, and if so, determining that the set plane is uneven.

11. The device of claim 10, wherein the selection module comprises:

a first selection submodule configured for, for each target set plane, selecting a point in the target set plane, which is furthest away from the reference plane corresponding to the target set plane, as a mark point;

or, a second selection submodule configured for, for each target set plane, determining a distance from each of uneven points in the target set plane to the reference plane corresponding to the target set plane, calculating the difference between the distance and the first threshold; obtaining the number of the uneven points in each of preset difference intervals, and identifying a difference interval with the largest number of uneven points as a mark difference interval, and determining a point in the mark difference interval as a mark point.

12. The device of claim 11, wherein the generation module comprises:

a first generation submodule configured for generating a virtual plane that passes through the mark point and is parallel to the reference plane corresponding to the target set plane, when the number of the mark points is one; and a second generation submodule configured for selecting one of the mark points and generating a virtual plane that passes through the selected mark point and is parallel to the reference plane corresponding to the target set plane, when the number of the mark points is more than one.

13. The device of claim 8, wherein the set plane comprises ground and/or wall surfaces.

14. An electronic apparatus comprising a housing, a processor, a memory, a circuit board and a power supply circuit, wherein the circuit board is arranged inside a space enclosed by the housing, the processor and the memory are arranged on the circuit board; the power supply circuit is used to supply power for various circuits or elements of the electronic apparatus; the memory is used to store executable program codes, and the processor executes the executable program codes stored in the memory by reading the executable program codes so as to carry out the method for adjusting a 3D model of claim 1.

* * * * *